No. 860,467. PATENTED JULY 16, 1907.
L. HAUSCHILD.
SETTING TOOL FOR FUSES.
APPLICATION FILED JULY 31, 1906.

UNITED STATES PATENT OFFICE.

LEOPOLD HAUSCHILD, OF ESSEN-ON-THE-RUHR, GERMANY, ASSIGNOR TO FRIED. KRUPP AKTIENGESELLSCHAFT, OF ESSEN-ON-THE-RUHR, GERMANY.

SETTING-TOOL FOR FUSES.

No. 860,467.  Specification of Letters Patent.  Patented July 16, 1907.

Application filed July 31, 1906. Serial No. 328,562.

*To all whom it may concern:*

Be it known that I, LEOPOLD HAUSCHILD, a subject of the Emperor of Germany, and a resident of Essen-on-the-Ruhr, Germany, have invented certain new and useful Improvements in Setting-Tools for Fuses, of which the following is a specification.

This invention relates to setting tools for fuses, that is to say, tools for adjusting such time fuses that are provided with an adjustment scale on the fuse, the object of the invention being to provide the setting tool with means for correcting the timing of the fuse.

One embodiment of the invention is illustrated in the accompanying drawing, by way of example.

Figure 1:
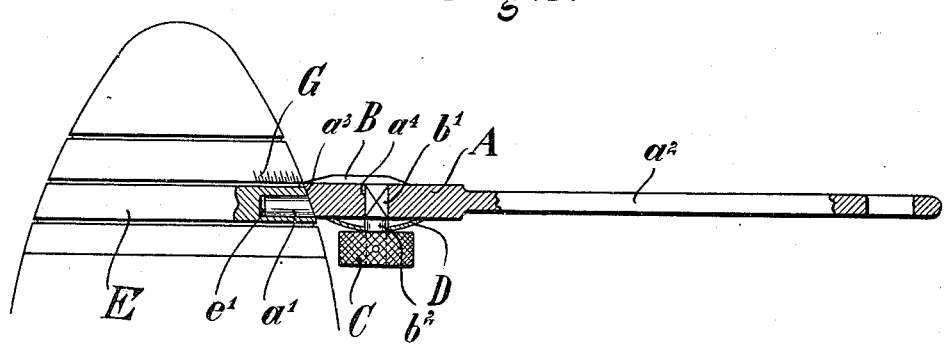
Figure 2:
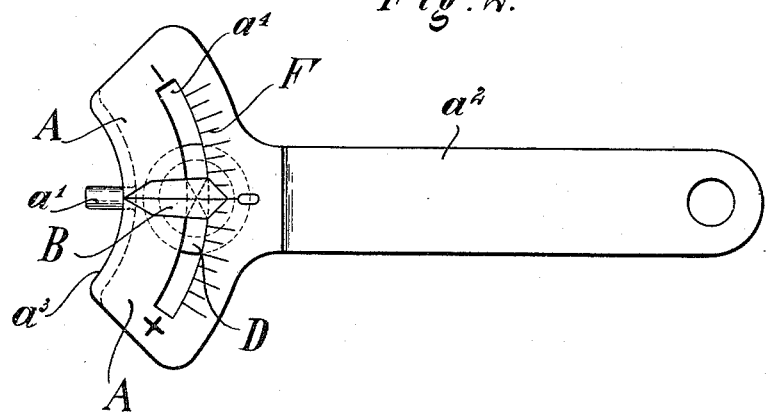

Figure 1 is a side view, partly in section, of the tool and the time fuse, and Fig. 2 is a top view of the tool.

The tool preferably comprises a flat segment A which has a front face $a^3$ conforming to the outer surface of the rotatable setting piece E of the fuse and provided with a pin $a'$, while a handle $a^2$ extends from the opposite face.

The segment A is provided with a slot $a^4$ which is concentric with the face $a^3$ and in which is guided a slide-piece $b'$ which thereby moves in a path parallel to the face of the fuse. The slide-piece $b'$ terminates in a bolt $b^2$ and is provided with an indicator B which rests on the segment and has two points. The indicator B is held in frictional engagement with the segment A through the medium of a plate spring D surrounding the bolt $b^2$ and abutting against a milled knob C secured on the bolt. Along the slot $a^4$ and in the path of travel of one of the points of the indicator is a scale F for correcting the time.

The indicator B is normally in the position shown in Fig. 2, that is to say, the zero position of the scale F.

In order to time the fuse, the pin $a'$ is introduced into a recess $e'$ provided in the rotatable setting piece E, as shown in Fig. 1, and the setting piece is thereupon turned by means of the tool until the indicator B registers with the mark on the scale G corresponding to the distance of the target, the scale G being arranged on the fixed setting piece E of the fuse.

If the path of flight of the projectile is correct relatively to the target and the time of bursting of the projectile is too early or too late, the timing of the fuse must be corrected. To that end, the indicator B is moved by means of the knob C until it registers with the mark on the scale F that corresponds to the required correction in timing. By means of the tool, the setting piece is thereupon turned into the position in which the indicator B points at the mark on the scale G that corresponds to the distance of the target. This done, the fuse has a duration of burning that is greater or less than the one originally adjusted, and the difference corresponds to the amount of adjustment of the indicator B from its zero position relatively to the scale F.

Having described my invention, what I claim as new is:

1. A setting tool for fuses, comprising means for engaging a setting piece on the fuse, a scale and an indicator adjustable over the scale on the setting tool and movable over the fuse during the setting of the fuse.

2. A setting tool for fuses having a curved face and a slot concentric with said face and comprising means for engaging a setting piece on the fuse, a scale, and an indicator adjustable in the slot and having two points, one of which is adapted for movement over the fuse during the setting of the fuse and the other of which is adjustable over the scale on the setting tool to set the first-mentioned point in proper position.

The foregoing specification signed at Düsseldorf, this nineteenth day of June, 1906.

LEOP. HAUSCHILD.

In presence of—
  WILLIAM ESSENWEIN,
  ALFRED POHLMEYER.